US008364829B2

(12) United States Patent
Mogul et al.

(10) Patent No.: US 8,364,829 B2
(45) Date of Patent: Jan. 29, 2013

(54) SYSTEM AND METHOD FOR ASCRIBING RESOURCE CONSUMPTION TO ACTIVITY IN A CAUSAL PATH OF A NODE OF A DISTRIBUTED COMPUTING SYSTEM

(75) Inventors: Jeffrey C. Mogul, Menlo Park, CA (US); Janet L. Wiener, Palo Alto, CA (US); Marcos K. Aguilera, Palo Alto, CA (US); Keith I. Farkas, San Carlos, CA (US); Parthasarathy Ranganathan, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2016 days.

(21) Appl. No.: 10/950,025

(22) Filed: Sep. 24, 2004

(65) Prior Publication Data

US 2006/0069786 A1    Mar. 30, 2006

(51) Int. Cl.
*G06F 15/16* (2006.01)
(52) U.S. Cl. ...................................................... 709/229
(58) Field of Classification Search .................... 709/229
See application file for complete search history.

(56) References Cited

U.S. PATENT DOCUMENTS

| | | | | |
|---|---|---|---|---|
| 4,881,227 A * | 11/1989 | Buhren | ........................... | 714/11 |
| 6,125,368 A * | 9/2000 | Bridge et al. | ........................... | 1/1 |
| 6,483,870 B1 * | 11/2002 | Locklear et al. | ............... | 375/222 |
| 6,516,348 B1 * | 2/2003 | MacFarlane et al. | ......... | 709/224 |
| 6,687,752 B1 * | 2/2004 | Falco et al. | .................... | 709/230 |
| 6,708,163 B1 | 3/2004 | Kargupta et al. | | |
| 6,717,982 B1 * | 4/2004 | Ishida et al. | ................... | 375/222 |
| 6,850,984 B1 * | 2/2005 | Kalkunte et al. | ............... | 709/229 |
| 6,968,394 B1 * | 11/2005 | El-Rafie | ........................ | 709/245 |
| 7,027,951 B1 * | 4/2006 | MacCormick et al. | ........ | 702/181 |
| 7,254,646 B2 * | 8/2007 | Aguilera et al. | ............... | 709/249 |
| 7,272,651 B1 * | 9/2007 | Bolding et al. | ................ | 709/227 |
| 7,426,573 B2 * | 9/2008 | Wells et al. | .................... | 709/238 |
| 7,480,711 B2 * | 1/2009 | Lownsbrough et al. | ....... | 709/223 |
| 7,610,369 B2 * | 10/2009 | Hirata et al. | ................... | 709/223 |
| 2002/0120770 A1 * | 8/2002 | Parham et al. | ................ | 709/238 |
| 2002/0176370 A1 * | 11/2002 | Ohba et al. | .................... | 370/252 |
| 2002/0178261 A1 * | 11/2002 | Chang et al. | ................... | 709/225 |
| 2003/0009582 A1 * | 1/2003 | Qiao et al. | ..................... | 709/233 |
| 2003/0093244 A1 * | 5/2003 | Corlett et al. | .................. | 702/186 |
| 2003/0110408 A1 * | 6/2003 | Wells et al. | ........................ | 714/1 |
| 2003/0121027 A1 * | 6/2003 | Hines | ............................. | 717/135 |
| 2003/0145105 A1 * | 7/2003 | Desineni et al. | ............... | 709/238 |
| 2004/0243461 A1 * | 12/2004 | Riggle | ............................. | 705/10 |
| 2005/0015424 A1 * | 1/2005 | Aguilera et al. | ............... | 709/200 |
| 2005/0060425 A1 * | 3/2005 | Yeh et al. | ....................... | 709/232 |
| 2005/0120128 A1 * | 6/2005 | Willes et al. | ................... | 709/232 |
| 2005/0165594 A1 * | 7/2005 | Chandra et al. | ................ | 703/11 |
| 2005/0169188 A1 * | 8/2005 | Cometto et al. | .............. | 370/249 |

(Continued)

OTHER PUBLICATIONS

Aguilera, M. et al., "Performance Debugging for Distributed Systems of Black Boxes", SOSP' 03, Oct. 19-22, 2003, Bolton Landing, New York; 16 pages.
Shah, R. et al., "Energy Aware Routing for Low Energy Ad Hoc Sensor Networks", Berkeley Wireless Research Center, University of California, Berkeley, 6 pages, Sep. 24, 2004.

(Continued)

*Primary Examiner* — Jerry Dennison (57) ABSTRACT

According to at least one embodiment, a method comprises identifying at least one causal path that includes a node of a distributed computing environment that is of interest. The method further comprises analyzing the identified at least one causal path to determine at least one time interval when the node is active in such causal path, and correlating consumption of a resource by the node to the node's activity in the at least one causal path.

29 Claims, 6 Drawing Sheets

U.S. PATENT DOCUMENTS

2005/0259571 A1* 11/2005 Battou .................... 370/217
2006/0069786 A1* 3/2006 Mogul et al. .............. 709/229
2006/0085559 A1* 4/2006 Lownsbrough et al. ..... 709/238

OTHER PUBLICATIONS

Chang, F. et al., "Energy-driven Statistical Profiling: Detecting Software Hotspots", Compaq Western Research Laboratories, 11 pages, Sep. 24, 2004.

U.S. Appl. No. 10/314,100, filed Dec. 7, 2002.
U.S. Appl. No. 10/601,371, filed Jun. 23, 2003.
Chase, J. et al., "Managing Energy and Server Resources in Hosting Centers", Dept. of Computer Science, Duke University, 14 pages, Sep. 24, 2004.
Intel Developer Forum—Spring 2003, 37 pages.

* cited by examiner

CAUSAL PATH 1

*FIG. 5B*

CAUSAL PATH 2

FIG. 6

SYSTEM AND METHOD FOR ASCRIBING RESOURCE CONSUMPTION TO ACTIVITY IN A CAUSAL PATH OF A NODE OF A DISTRIBUTED COMPUTING SYSTEM

CROSS-REFERENCE TO RELATED APPLICATIONS

This application is related to the following co-pending and commonly assigned patent applications: 1) U.S. patent application Ser. No. 10/601,371 filed Jun. 23, 2003, titled "ANALYSIS OF CAUSAL RELATIONS BETWEEN INTERCOMMUNICATING NODES," and 2) U.S. patent application Ser. No. 10/314,100 filed Dec. 2, 2002, titled "ANALYSIS OF LATENCIES IN A MULTI-NODE SYSTEM," the disclosures of which are hereby incorporated herein by reference.

FIELD OF THE INVENTION

This disclosure relates in general to distributed computing systems, and more particularly to systems and methods for attributing resource consumption to nodes of a distributed computing system to infer causes of such resource consumption.

DESCRIPTION OF RELATED ART

Many commercially-important systems, especially Web-based applications, are composed of a number of communicating components. These systems are often structured as distributed systems, with components running on different processors or in different processes. For example, a multi-tiered system may process requests from Web clients that flow through a Web-server front-end and then to a Web application server. The application server may then call a database server, for example, or other types of services such as for authentication, name service, credit-card authorization, or customer relationship management or other support functions.

Many problems that afflict complex distributed applications are concerned with resource usage. Prior approaches have attempted to reveal where resources (such as energy or lock contention) are being spent, but not why they are being spent. While identifying that a certain amount of a resource (e.g., energy) is being used by a given node or by a given process of a distributed computing environment is of benefit for certain analyses, for certain other types of analyses a mere indication of where resources are being spent in this manner is insufficient. This indication of where resources are being spent fails to correlate resource consumption with causality (i.e., fails to identify why the resources are being spent).

BRIEF SUMMARY OF THE INVENTION

According to at least one embodiment, a method comprises identifying at least one causal path that includes a node of a distributed computing environment that is of interest. The method further comprises analyzing the identified at least one causal path to determine at least one time interval when the node is active in such causal path, and correlating consumption of a resource by the node to the node's activity in the at least one causal path.

According to at least one embodiment, a system comprises logic operable to receive at least one causal path of a distributed computing environment. The system further comprises logic operable to receive at least one resource consumption trace quantifying resource consumption by a node, and logic operable to correlate the at least one resource consumption trace to activity of the node in the received at least one causal path.

According to at least one embodiment, a method comprises determining, for a time period of interest, at least one causal path in which a node under analysis is active. The method further comprises allocating resource consumption by the node under analysis during the time period of interest to the at least one causal path.

According to at least one embodiment, a method comprises determining at least a first causal path defined by a first pattern of messages between nodes of a distributed computing environment, the at least a first causal path including a node of the distributed computing environment that is of interest. The method further comprises determining at least a second causal path defined by a second pattern of messages between the nodes of the distributed computing environment, the at least a second causal path including the node of interest. The method further comprises allocating consumption of a resource by the node of interest among the first and second patterns.

According to at least one embodiment, computer-executable software code stored to a computer-readable medium is provided, where the computer-executable software code comprises code for ascribing resource usage of a given node of a distributed computing environment that is of interest to a plurality of causal paths that include the given node of interest. The computer-executable software code further comprises code for identifying message patterns in the plurality of causal paths. The computer-executable software code further comprises code for allocating resource usage of the given node among a plurality of different message patterns, if the plurality of different message patterns are identified in the plurality of causal paths by the code for identifying, and code for outputting the allocated resource usage of the given node.

According to at least one embodiment, a method comprises identifying a period when a plurality of causal paths are simultaneously active at a given node of a distributed computing environment, and identifying the amount of a resource consumed during the identified period by the given node. The method further comprises allocating the identified amount of resource consumption among the plurality of simultaneously active causal paths based on overall patterns of resource consumption by the plurality of simultaneously active causal paths at the given node.

DETAILED DESCRIPTION

Figure 1:
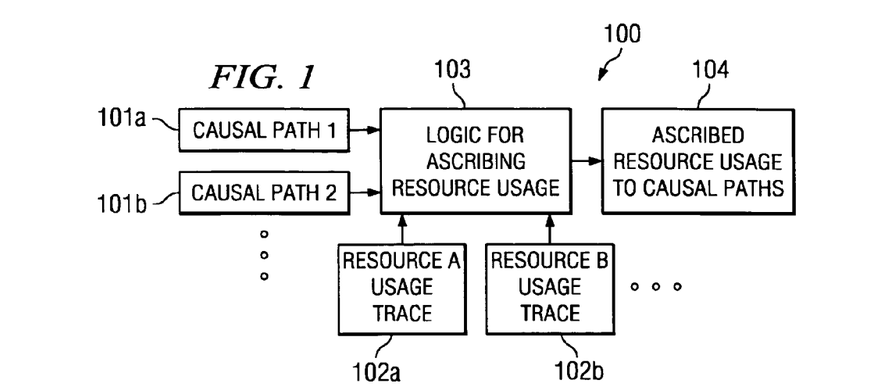
FIG. 1 shows an example system according to one embodiment for ascribing resource usage to nodes in the causal paths of a distributed computing environment.

Turning to FIG. 1, an example system 100 according to one embodiment for ascribing resource usage to nodes in the causal paths of a distributed computing environment is shown. As shown, logic for ascribing resource usage 103 is implemented to receive one or more causal paths, such as causal path 1 (101a) and causal path 2 (101b) in FIG. 1. Logic 103 further receives one or more resource usage traces, such as resource A usage trace 102a and resource B usage trace 102b in FIG. 1. For instance, resource A may be energy consumed by a given node, and resource B may be CPU usage of a given node. As described further herein, various quantified resources may be measured and allocated in accordance with the embodiments provided herein. Logic 103 processes the received causal paths and resource usage traces to ascribe resource usage of a node to the causal paths 101 that include such node, thus generating output 104. As described further herein, logic 103 may be implemented as software code, hardware, firmware, middleware, or any combination thereof. Logic 103 implements certain algorithms described further herein to correlate resource consumption with causality within a distributed computing environment. The causal paths (101a, 101b), resource traces (102a, 102b), and example algorithms that may be employed by logic 103 in accordance with certain embodiments are described further below.

Figure 2A:
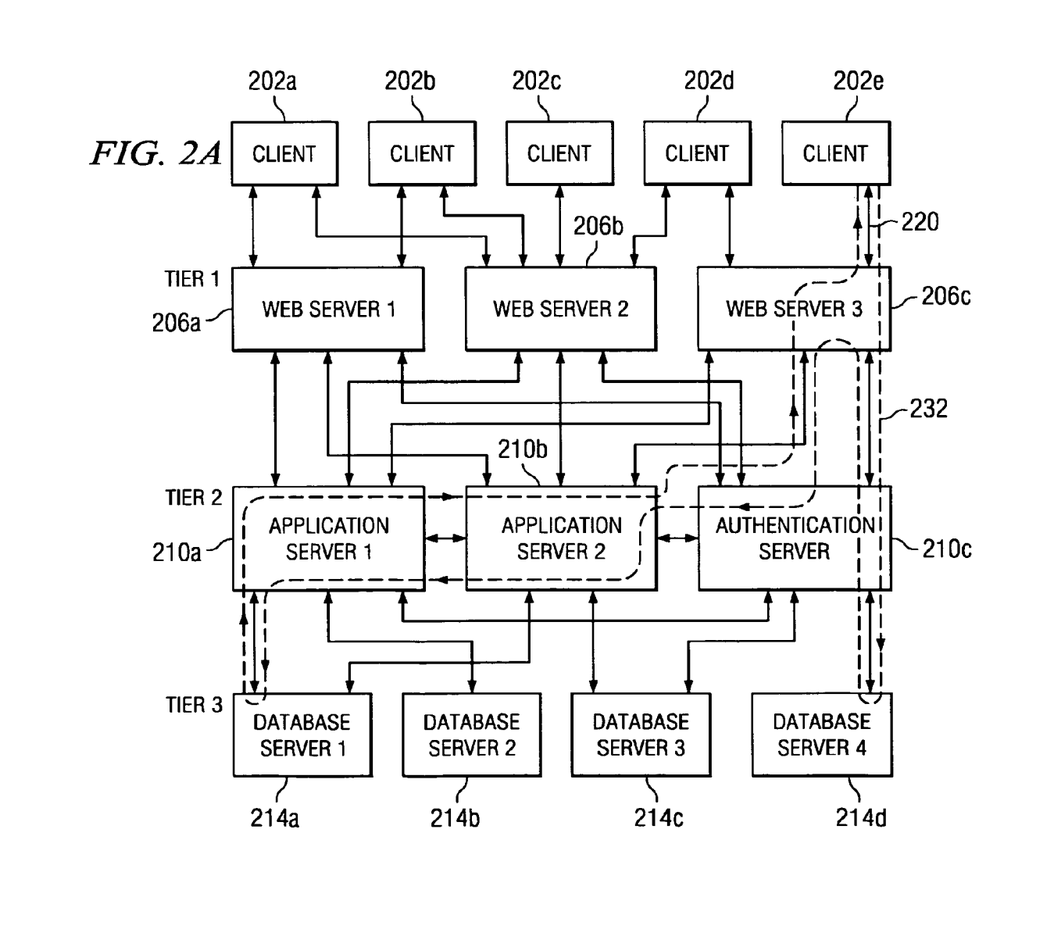
FIG. 2A shows an example multi-tiered data processing arrangement, in which an example causal path is illustrated.

FIG. 2A shows an example multi-tiered data processing arrangement, in which an example causal path is illustrated. Thus, FIG. 2A shows an example distributed computing environment and illustrates an example causal path within such distributed computing environment, wherein such causal path may be received as input for analysis in accordance with certain embodiments described herein (such as causal paths 101a, 101 b received by logic 103 in FIG. 1). The example of FIG. 2A includes tiers 1-3. Clients 202a-e communicate with web servers 206a-c (tier-1 nodes), which communicate with application and authentication servers 210a-c (tier-2 nodes), which communicate with database servers 214a-d (tier-3 nodes). This example of FIG. 2A is a classic example of a multi-tiered, distributed Web application in which user interface processing is performed in the client (e.g., personal computer ("PC")) at the user's location (e.g., in client nodes 202a-e), business processing is performed in a remote computer (e.g., in tiers 1 and/or 2 in the example of FIG. 2A), and database access and processing is performed in another computer (e.g., in tier 3 of FIG. 2A) that provides centralized access for many business processes.

Even though it is not shown, it will be appreciated that the network components, such as switches and routers, could also be nodes that are considered in a causal path. Thus, the granularity of the distributed processing system need not be at the granular level shown in the example of FIG. 2A. For instance, the distributed processing system may be represented at a coarser grain (e.g., with each node representing a cluster of computers, rather than a single computer), or at a finer grain, which may, for example, include each of the intercommunicating processes executing on a given node (e.g., each intercommunicating process executing on client 202e and/or each intercommunicating process executing on web server 206c). Accordingly, depending on the particular granularity under analysis, a "distributed computing environment" may refer to intercommunicating computers across a network (such as in the example of FIG. 2A), intercommunicating processes within a single computer system, or even intercommunicating software modules, components, or objects within a given software application, as examples. Accordingly, the term "distributed computing environment" (or "distributed computed system"), as used herein, is not intended to be limited to multiple computers that are remote from each other, except when accompanying language specifies this type of arrangement. Thus, the "nodes" of a distributed computing environment may refer to any intercommunicating objects of a given system. For instance, depending on the granularity at which a system is being analyzed, each "node" may be separate clusters of computers, separate individual computers, separate processors implemented on one or more computers, separate processes executing on a single node, or even separate instructions within a single software process, as examples. Accordingly, while an example of a distributed computing system is represented in FIG. 2A, those of ordinary skill in the art will readily recognize that the techniques described herein can be applied at a distributed computing system of different granularity.

In analyzing a given distributed computing environment, it may be desirable to know not only how much of a resource is being used by a node, but where it is being used, and why. For example, in a multi-tier Web application, such as that of FIG. 2A, it might be useful to know that a lot of elapsed time is being spent in the authentication server 210c ("where"). Further, it may be useful to know that this time is spent when the authentication server 210c is invoked by a "shopping-cart component," but not when the authentication server 210c is invoked by a "user-profile component." Thus, "why" the elapsed time is occurring in the authentication server 210c may be tied to the causal path of the shopping-cart component, in this example. Accordingly, by ascribing resource usage to activity of a node in its identified causal path patterns, an understanding of the activity of the node in consuming the resource can be determined in the context of these corresponding causal path patterns.

Thus, one way to indicate why resources are being consumed in a computer system having more than one computational node in accordance with an embodiment provided herein, is to identify the causal paths of activity within that system. In a system where the nodes communicate using messages, a causal path is the set of messages associated with one activity in the system (such as the request for a Web page), with the causal relationship(s) between messages indicated. A causal relationship exists between a pair of messages when the receipt of one of the messages leads, perhaps after a delay, to the transmission of the other message.

The sequence of messages and nodes that constitute a causal path might reappear many times during the operation of a computer system. Taken together, the multiple causal paths with one given identical sequence of messages and nodes form a causal path pattern. A causal path pattern can be used to aggregate measurement information derived from the individual causal path instances. For example, a given causal path may have a specific delay associated with a node, and the causal path pattern instead might associate an average delay with that node.

Tools for analyzing resource consumption have typically looked at time resources, such as latency and CPU time. However, in modern systems we are increasingly concerned with other kinds of quantified resources, such as energy and network bandwidth or packet rates. Various embodiments are described herein that utilize causal path analysis for analyzing the consumption of these types of quantified resources in a distributed computing environment.

Figure 2B:
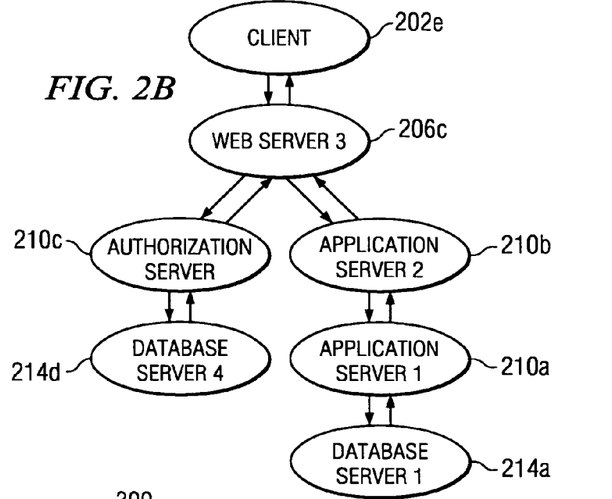
FIG. 2B shows a graph of the example causal path from FIG. 2A.

An example of a causal path pattern is shown in FIGS. 2A and 2B. The solid, directional lines between the nodes in FIG. 2A represent communication activity between the nodes. For example, lines 220 represents bi-directional communication activity between client 202e and web server 206c. The communication events between nodes may be referred to as messages. From a collection of messages that are exchanged between the nodes (often referred to as a "message trace"), one or more subsets of this collection of messages may each form a causal path. For example, dashed line 232 illustrates a hypothetical causal path pattern, or alternatively a single instance of such a pattern. Algorithms exist to analyze a trace of such messages and thereby infer the presence of one or more causal paths in that trace. Inferring a causal path is based on an assumption that there is some causality between messages sent to and from a given node. For example, a message directed to a first node may result in one or more messages being sent from the first node to one or more other nodes.

The example causal path 232 represents a possible scenario in which client 202e sends a message to web server 206c (tier-1 node). In response, web server 206c sends a message to authentication server 210c (tier-2 node), which in turn sends a message to database server 214d (tier-3 node). Database server 214d responds with a message back to authentication server 210c, which returns a message to web server 206c. Web server 206c sends a message to application server 210b, which in turn sends a message to application server 210a, which in turn sends a message to database server 214a. Messages are then sent back up the tiers from database server 214a to application server 210a; from application server 210a to application server 210b; from application server 210b to web server 206c; and from web server 206c to client 202e. It will be appreciated that multiple causal path patterns may be inferred from an input set of messages between nodes, even though only one causal path pattern is illustrated in the example of FIG. 2A.

The input set of messages (message trace) from which causal paths may be inferred may be compiled from a number of sources, for example, passive network monitoring (for communication edges that flow between computers), also known as packet capture or "packet sniffing", kernel instrumentation, middleware instrumentation, or even application instrumentation, as examples.

The information of interest in the message traces includes a timestamp, a source identifier, and a destination identifier. Other information might be useful to improve the accuracy of the inferred causal paths, depending on the specific inference algorithm used). The timestamp indicates the time at which the message was sent, the source identifier indicates the node from which the message was sent, and the destination identifier indicates the node to which the message was sent. The timestamps of different source nodes (sources for brevity) need not have the same time reference. In some distributed computing systems, the collecting of message traces may be distributed along nodes of the system so that different sources are monitored by different entities having local clocks. These clocks need not be synchronized with each other, the clocks need only have approximately the same rate, which is the case if they accurately measure intervals of real time.

FIG. 2B is a graph of the example causal path pattern 232 from FIG. 2A. Each of the vertices is labeled with the reference number of the represented node from FIG. 2A. For example, the first vertex in the graph is client node 202e. As shown, a causal relation between messages sent from client 202e to web server 206c and other messages sent from web server 206c to authentication server 210c is inferred from the message traces. As further shown, the message traces may be analyzed to infer the illustrated causal relation between messages sent from web server 206c to authentication server 210c and messages sent from authentication server 210c to database server 214d.

That is, the message trace set (i.e., set of messages between the nodes) may be analyzed to determine the causality of communication in the distributed computing environment, thereby generating a set of causal path patterns showing how repeated activity in the distributed system follows certain paths. Whether a causal relation is inferred between messages from a source node to a destination node and messages arriving at the source node may depend on a probability distribution of differences between timestamps of messages from the source to the destination and timestamps of messages arriving at the source. An example technique for inferring a causal path or causal path pattern from message traces is described further in co-pending and commonly assigned U.S. patent application Ser. No. 10/601,371, filed Jun. 23, 2003 titled "ANALYSIS OF CAUSAL RELATIONS BETWEEN INTERCOMMUNICATING NODES," the disclosure of which is hereby incorporated herein by reference. Of course, embodiments described further herein are not limited to use of causal paths derived from the above-incorporated patent application, but may likewise use causal paths derived from any technique now known or later discovered. As described further herein, the derived causal paths are preferably annotated with information identifying how much time is spent in each traversal of each node, such as in the example causal paths of the above-incorporated patent application. Note that on a given causal path, a single node might be traversed once or more than once. These causal paths could also be annotated with additional information, such as the amount of time spent traversing the link between two nodes. Causal path patterns can be annotated with aggregate information, such as the average time spent in each node traversal, or a histogram of such times.

Additionally, trace(s) of the use (or "consumption") of some resource of interest, such as electrical energy or CPU time, is/are determined in certain embodiments. For instance, one such trace may be obtained at each node of a distributed computing environment. For example, considering a distributed computing environment having nodes A, B, and C, a trace for energy consumption by node A, a trace for energy consumption by node B, and a trace for energy consumption by node C may each be determined. The traces preferably provide time-varying measurements (or otherwise quantified consumption) of a given resource (such as energy) by the corresponding node. Each resource consumption trace may include such information as a timestamp and the instantaneous value of the specific resource (for example, the energy consumed at that node since the previous trace record, or the non-idle CPU time expended since the previous trace record, or the number of CPU data cache misses since the previous trace record). Various methods for obtaining these traces are known, and any such method now known or later discovered may be employed.

It is preferable that the timestamps in all of the trace sets used, including those from which causal paths are inferred and those of resource use, have reasonably precise resolution and reasonably close synchronization of the timebases (or "clocks") used for timestamping. For example, in certain embodiments the trace sets have timestamps of 10 milliseconds or smaller. Of course, the resolution of the timestamps implemented may be greater than 10 milliseconds in certain applications. Various techniques for arranging that such clocks have reasonably close synchronization are known, and any technique now known or later discovered for employing such clocks may be utilized.

As described further herein, the causal paths 101a, 101b, etc. and the resource consumption trace sets 102a, 102b, etc. may be processed by logic 103 for ascribing resource consumption of a node to that node's respective activity in its causal path(s). It should be noted that the trace sets may be first obtained and then processed "offline" by logic 103, after the system under analysis has finished a significant task, or logic 103 may be implemented to process the trace sets in shorter chunks, overlapping trace processing with the operation of the system under analysis. This latter "online" approach could be useful for feedback-based control of the system under analysis, or for near-term system management decisions, as examples, while the offline approach may be more useful for in-depth analysis of system problems.

Figure 3:
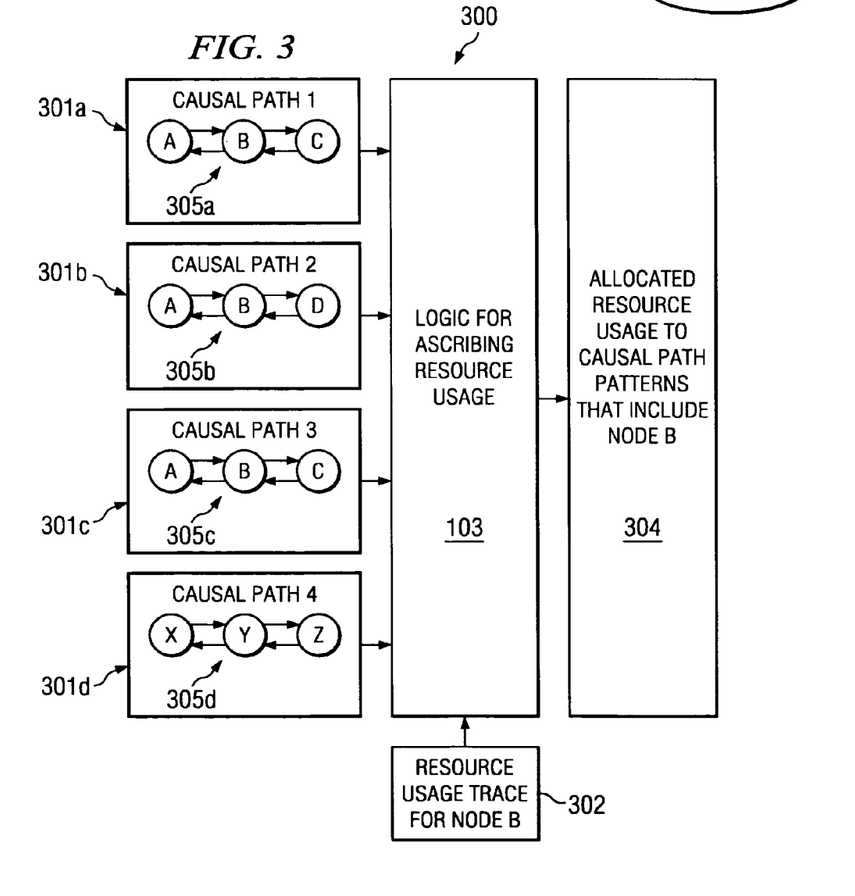
FIG. 3 shows another example system according to one embodiment for allocating resource usage by a node of a distributed computing environment among a plurality of different causal paths that include such node.

In accordance with certain embodiments, the resource usage of a node is allocated among a plurality of different causal path patterns that include such node. For instance, FIG. 3 shows an example system 300 of one embodiment for allocating resource usage of a node among a plurality of different causal path patterns that include such node. As shown in this illustrated embodiment, logic 103 receives as input causal paths 1-4 (labeled with reference numbers 301a-301d respectively in FIG. 3). Each causal path is an instance of a corresponding causal path pattern. That is, each causal path is an instance of a corresponding pattern of messages between nodes of the distributed computing environment. For instance, causal path 1 (301a) matches (or is defined by) a corresponding pattern 305a, in which messages are exchanged between nodes A, B, and C as shown. Likewise, causal path 3 (301c) matches this same pattern (labeled 305c) of messages being exchanged between nodes A, B, and C. Thus, causal paths 1 (301a) and 3 (301c) match the same causal path patterns (305a and 305c). Causal path 2 (301b) matches a corresponding pattern 305b, in which messages are exchanged between nodes A, B, and D as shown. Causal path 4 (301d) matches a corresponding pattern 305d, in which messages are exchanged between nodes X, Y, and Z as shown. Thus, causal path 4 does not include Node B in its pattern 305d at all. Accordingly, when ascribing resource usage by Node B to the corresponding causal paths that include Node B, logic 103 may ascribe some of Node B's resource usage to each of causal paths 1-3 but not to causal path 4 (because causal path 4 does not include Node B).

In this example, logic 103 receives a resource usage trace 302 for Node B. Of course, resource usage traces may be received for a plurality of different nodes that may be of interest in the distributed computing environment. Further, while a resource usage trace for consumption (or "usage") of a single resource by Node B (e.g., energy consumption, etc.), a plurality of different resource usage traces for a given node may be received by logic 103, and usage each of the resources may be allocated to causal path patterns in the manner described further herein. Logic 103 allocates the resource usage of Node B (as reflected by trace 302) to the various different causal path patterns that include Node B, thus generating output 304. For instance, logic 103 allocates a portion of the resource usage of Node B to the causal path pattern of causal paths 1 (301a) and 3 (305c) and a portion of the resource usage of Node B to the causal path pattern of causal path 2 (305b). While two different causal path patterns that include Node B are shown in this example for simplicity, any number of different causal path patterns that include a given node of interest may exist.

Figure 4:
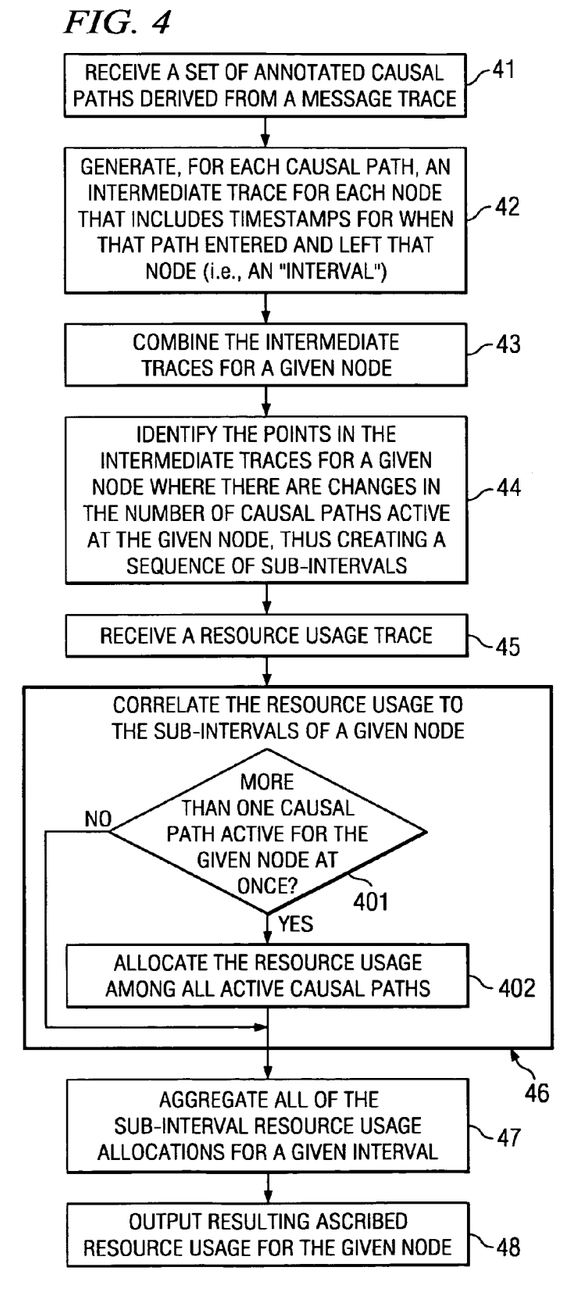
FIG. 4 shows one example algorithm that is employed in accordance with one embodiment.
Figure 5A:
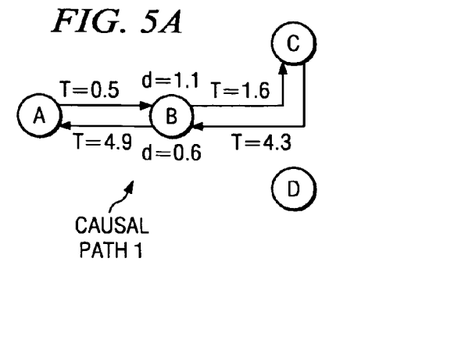
FIGS. 5A-5B each show example causal paths.
Figure 5B:
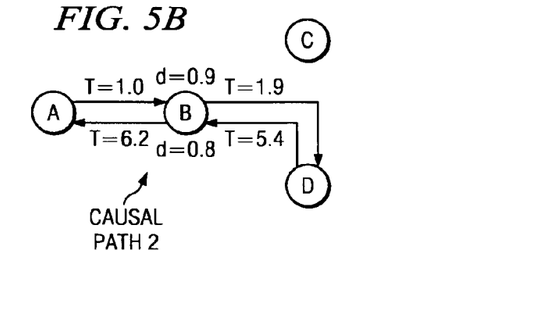
Figure 5C:
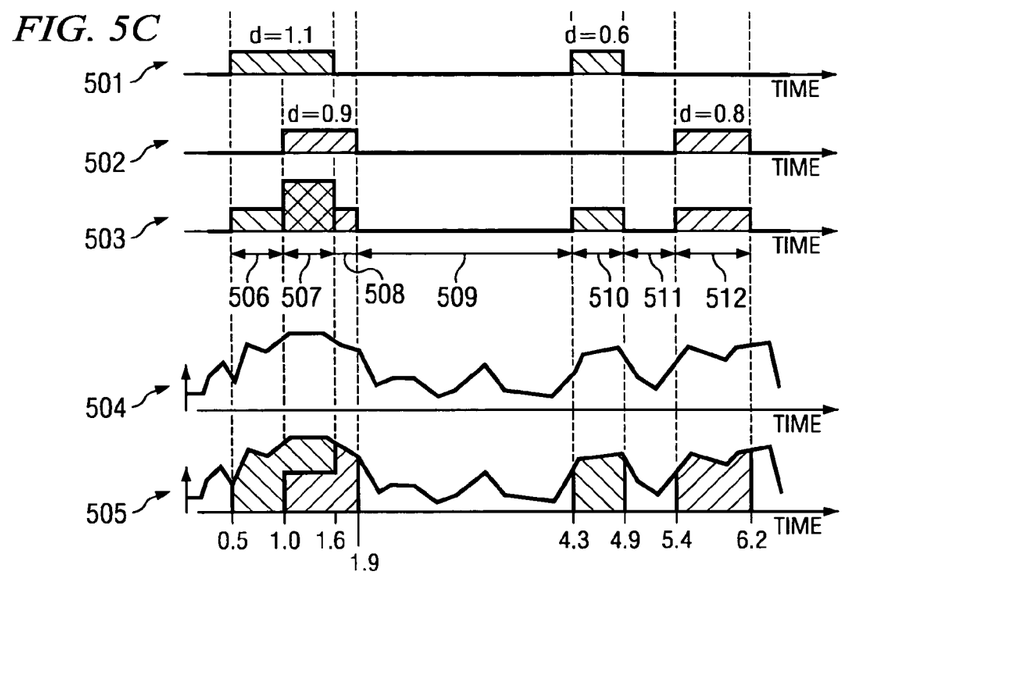
FIG. 5C shows corresponding graphs illustrating an example of the analysis of a node (Node B) in the causal paths of FIGS. 5A-5B and correlating resource consumption to such node.

Various different algorithms may be employed by logic 103 (FIG. 1) for ascribing resource usage to nodes within the causal paths, as well as allocating the resource usage of a node to causal path patterns that include such node. One example algorithm that is employed by logic 103 in accordance with one embodiment for ascribing resource usage of a node to causal paths that include the node is shown in FIG. 4 In operational block 41 of FIG. 4, a set of annotated causal paths that are derived from a message trace are received by logic 103. For instance, in FIG. 1, causal paths 101a and 101b are received by logic 103. FIGS. 5A-5C will be referred to in discussing the example operational flow of FIG. 4. FIGS. 5A-5B show example causal paths 1 and 2, respectively, and FIG. 5C shows corresponding graphs illustrating an example of the analysis of Node B in such causal paths and correlating resource consumption (e.g., energy usage) to such Node B.

More particularly, referring to the example causal paths of FIGS. 5A-5B, such causal paths are derived for an example distributed computing environment that includes Nodes A-D. Each causal path is annotated with timestamps (shown as "T" in FIGS. 5A-5B) for the communications (messages) occurring between the nodes. Further, from such timestamps, delays (shown as "d" in FIGS. 5A-5B) can be inferred, assuming that the network delays between the nodes are negligible (otherwise, each message between nodes would be annotated with a pair of timestamps, to show the send-time and the receive-time for a message). Again, the example technique for inferring a causal path from message traces between nodes in a distributed computing environment as described further in co-pending and commonly assigned U.S. patent application Ser. No. 10/601,371, filed Jun. 23, 2003, titled "ANALYSIS OF CAUSAL RELATIONS BETWEEN INTERCOMMUNICATING NODES" may be used for deriving causal paths 1 and 2 of FIGS. 5A-5B.

In causal path 1 of FIG. 5A, Node A sends a message to Node B, which in turn sends a message to Node C. Node C then sends a message back to Node B, which in turn sends a message back to Node A. From the timestamp annotations in this example, it can be seen that the message from Node A is sent to Node B at timestamp T=0.5, and the message from Node B is sent to Node C at timestamp T=1.6. Thus, a delay of d=1.1 occurs at Node B (between Node B receiving the message from Node A and Node B sending the message to Node C). The message from Node C is sent to Node B at timestamp T=4.3, and the message from Node B is sent to Node A at timestamp T=4.9. Thus, a delay of d=2.7 (i.e., 4.3−1.6=2.7) occurs at Node C, although this delay is not shown in the example causal path of FIG. 5A because the examples of FIGS. 5A-5C focus on ascribing resource consumption to activity of Node B. A second delay, in the amount of d=0.6, occurs at Node B in this return path between the time that Node B receives the message from Node C and the time that Node B sends the message to Node A. It should be understood that the terms "traversal," "interval," and "delay" are used herein in a related manner for describing the execution through a causal path. For example, one might say that a traversal covers a certain internal in time, and the duration of that interval is its delay value.

In causal path 2 of FIG. 5B, Node A sends a message to Node B, which in turn sends a message to Node D. Node D then sends a message back to Node B, which in turn sends a message back to Node A. Thus, Node B is active in both causal paths 1 (FIG. 5A) and 2 (FIG. 5B), as is Node A. Further, causal paths 1 and 2 have different causal path patterns or message patterns in this example. Of course, in ascribing resource usage of a node among the causal paths in which the node is active, the various causal paths may have the same pattern. Techniques for allocating the resource usage of a node among various different causal path patterns are described further below herein, but the current focus in describing FIGS. 4 and 5A-5C is on first ascribing resource usage a node to the causal paths in which it is active (irrespective of whether those causal paths have the same or different patterns).

From the timestamp annotations in the example causal path 2 (FIG. 5B), it can be seen that the message from Node A is sent to Node B at timestamp T=1.0, and the message from Node B is sent to Node D at timestamp T=1.9. Thus, a delay of d=0.9 occurs at Node B (between Node B receiving the message from Node A and Node B sending the message to Node D). The message from Node D is sent to Node B at timestamp T=5.4, and the message from Node B is sent to Node A at timestamp T=6.2. Thus, a delay of d=3.5 (i.e., 5.4-1.9=3.5) occurs at Node D, although this delay is not shown in the example causal path of FIG. 5B because the examples of FIGS. 5A-5C focus on ascribing resource consumption to activity of Node B. A second delay, in the amount of d=0.8, occurs at Node B in this return path between the time that Node B receives the message from Node D and the time that Node B sends the message to Node A.

In operational block 42 of FIG. 4, logic 103 generates, for each such causal path, an intermediate trace for each node that includes timestamps for when that path entered and left that node. For example, for a system under analysis having nodes A, B, C, an intermediate trace might include the following records of Table 1 (among others):

TABLE 1

| Time | Causal Path Location |
|---|---|
| 10.030 | A->^B->C->B->A |
| 10.033 | A->B^->C->B->A |
| 10.062 | A->B->C->^B->A |
| 10.069 | A->B->C->B^->A |

The causal-path-location notation of Table 1 (used here simply for explanatory convenience) shows the flow of messages between nodes, and the caret ("^") in this notation shows the point along the path represented by the corresponding intermediate trace record. In an actual implementation, the causal-path-location might be encoded in a more efficient way. Note that in general properly chosen pairs of such trace records describe intervals in which an activity is "visiting" each node along the causal path. Thus, in the above example of Table 1, 3 msec of elapsed time is spent in node B before calling node C (from time 10.030 to time 10.033), and 7 msec of elapsed time is spent in node B after the call to node C returns (from time 10.062 to time 10.069). It might be expedient to represent such intervals explicitly in the intermediate trace, such as in Table 2:

TABLE 2

| Intermediate Interval | Causal-Path-Location |
|---|---|
| 10.030-10.033 | A->^B->C->B->A |
| 10.062-10.069 | A->B->C->^B->A |

Note that the example above includes only the timestamps pertaining to node B, but a full trace would also include timestamps for nodes A and C, and may include many instances of each causal-path-location.

As a further example, reference is now made to FIGS. 5A-5C, wherein an intermediate trace is generated for nodes A, B, and C of causal path 1 of FIG. 5A, and an intermediate trace is generated for nodes A, B, and D of the causal path 2 of FIG. 5B. The top two timelines in FIG. 5C, labeled 501 and 502, graphically illustrate example intermediate traces for Node B in the causal paths 1 (of FIG. 5A) and 2 (of FIG. 5B), respectively. For instance, timeline 501 graphically illustrates the activity of Node B in causal path 1 (FIG. 5A), showing that Node B is active between timestamps T=0.5 and T=1.6 and between timestamps T=4.3 and T=4.9. Timeline 502 graphically illustrates the activity of Node B in causal path 2 (FIG. 5B), showing that Node B is active between timestamps T=1.0 and T=1.9 and between timestamps T=5.4 and T=6.2.

In operational block 43, logic 103 combines the intermediate traces for a given node. This provides a view of the causal paths entering and leaving that node. For example, the third timeline in FIG. 5C, labeled 503, shows the output of this step for Node B in the example causal paths of FIGS. 5A-5B. For some periods, more than one causal path may be active simultaneously for a given node. For instance, in the example of FIGS. 5A-5C, both causal paths 1 (FIG. 5A) and 2 (FIG. 5B) are active for Node B during time period T=1.0 to T=1.6. This overlap of activity for the plurality of causal paths for Node B between timestamps T=1.0 and T=1.6 is illustrated in timeline 503 in FIG. 5C.

In operational block 44, logic 103 identifies the points in the intermediate traces for the given node where there are changes in the number of causal paths active at such node. This creates a sequence of sub-intervals. For instance, logic 103 may iterate through the intervals described by the intermediate traces and create a sequence of sub-intervals that reflect the points in time when there are changes in the number of causal path instances simultaneously active at any given node. Thus, this determines for each point in time how many causal path instances are simultaneously active at a given node, and which causal path patterns to which these instances correspond. These change points defining such sub-intervals are shown by the arrows in timeline 503 of the example of FIG. 5C. That is, sub-intervals (or intermediate traces) 506-512 are determined for Node B in FIG. 5C. Sub-interval 506 is a period of activity of Node B in causal path 1 (FIG. 5A). Sub-interval 507 is a period of activity of Node B in both causal paths 1 (FIG. 5A) and 2 (FIG. 5B). Sub-interval 508 is a period of activity of Node B in causal path 2 (FIG. 5B). Sub-interval 509 is a period of no activity of Node B in the causal paths. Sub-interval 510 is a period of activity of Node B in causal path 1 (FIG. 5A). Sub-interval 511 is a period of no activity of Node B in the causal paths, and sub-interval 512 is a period of activity of Node B in causal path 2 (FIG. 5B).

In operational block 45 of FIG. 4, logic 103 receives a resource usage trace, such as resource usage traces 102a and 102b in the example of FIG. 1. Of course, while the resource usage trace is received in block 45 of the example operational flow of FIG. 4, in alternative implementations such resource usage trace may be received by logic 103 at a different point of the flow (e.g., immediately before, immediately after, or concurrent with receipt of the causal paths in block 41). Timeline 504 in FIG. 5C shows an example of a possible energy trace made at Node B during the time period under analysis. Of course, while energy is the example resource analyzed in the example of FIG. 5C, the algorithm may likewise be applied to a resource trace representing some other time-varying quantifiable resource, such as CPU usage, network bandwidth, network packet rates, cache misses, address translation buffer misses, page faults, memory allocations, lock contention, etc. In general, such a "quantifiable resource" can be any resource whose consumption by a given node can be measured, inferred, estimated, or otherwise quantified. Various techniques for measuring energy consumption for such a node are known. For instance, assuming that Node B is a computer system, various ways are known to measure the electrical energy consumption by such a computer system. One technique is to measure the AC power drawn. However, measuring the AC power consumer by computer systems is complicated by the presence of significant AC current harmonics, thus possibly increasing the cost and complexity of the measurement circuitry. Another likely simpler approach is to measure the DC current and voltage (perhaps obtaining one of these indirectly) drawn by significant components in the system. This approach is more able to obtain fine-timescale measurements but requires invasive techniques for many modern computers. While present day systems do not typically offer the ability to measure their DC power consumption at fine granularities, relatively inexpensive techniques exist for providing such measurements. Thus, just as we have come to expect features like "performance counters" in CPUs, future computer systems may provide techniques for readily obtaining these measurements.

Techniques are also known for measuring energy consumption by software components, such as the technique described in "Energy-driven Statistical Profiling: Detecting Software Hotspots" by Fay Chang, Keith Farkas, and Parthasarathy Ranganathan, *Lecture Notes in Computer Science*, special issue on power management, 2002. Thus, assuming further that Node B is a software process, its energy consumption may likewise be obtained. Of course, any other technique now known or later discovered for measuring or otherwise quantifying the energy consumed by Node B (given the granularity of such node) during the time period of interest may be utilized. Further, techniques now known or later discovered may be similarly used for measuring or otherwise quantifying consumption of other types of quantifiable resources, and thus the techniques described herein are not limited to energy consumption but are likewise applicable to any other quantifiable resource consumption.

In operational block 46 of FIG. 4, logic 103 correlates the resource usage to the sub-intervals of a given node (such as the sub-intervals identified in block 44, e.g., sub-intervals 506-512 of FIG. 5C). For instance, for each sub-interval, the (zero or more) resource consumption trace records collected at the given node(s) during such sub-interval are determined. For a given tuple (sub-interval, node, resource-value), the resource consumption during such sub-interval is allocated among the one or more causal path instances currently active at that node. This allocation might be performed in several ways. Timeline 505 in FIG. 5C shows the assignments/allocations of operational block 46 for Node B. For example, in FIG. 5C, during sub-interval 506, only causal path 1 is active in Node B; therefore, all of the resource consumption (from timeline 504) during sub-interval 506 is allocated to causal path 1. However, during sub-interval 507, both causal path 1 and causal path 2 are active in Node B. Therefore, the resource consumption (from timeline 504) during sub-interval 507 should be allocated somehow between the two causal paths. The shading shown for sub-interval 507 in timeline 505 implies an approximately equal allocation but this is not the only possible allocation algorithm.

It should be noted that when more than one causal path is active at once for a given node, the resource consumption is allocated among all active causal paths. Thus, sub-operations 401 and 402 may be included in the correlation operation of block 46. Sub-operation 401 determines whether more than one causal path is active for the given node during the sub-interval under analysis. If more than one causal path is active for the node during the sub-interval under analysis, as in sub-interval 507 for Node B in the example of FIG. 5C, operation advances to sub-operation 402 whereat the resource usage is allocated among all active causal paths. In this case, the active causal paths may have the same or different causal path patterns. Irrespective of their respective patterns, if more than one causal path is active at a given point in time, logic 103 ascribes a portion of the resource usage at the given point in time to each of the active causal paths. One way (of several possible ways) of performing this allocation among all active causal paths is to assume that resource consumption is additive. Therefore, when N causal paths are active at a node, each is allocated 1/N of the resource trace value. Another type of allocation that may be used in this instance is to allocate the entire value to each of the N active causal path instances at the node (this provides a conservative estimate or upper threshold of the maximum consumption of each active causal path). As still another example, in certain implementations, logic 103 may use information from the trace about how the resource usage at a node varies as a function of the number of active causal path instances, and then normalize the per-path allocation based on that result. Thus, a defined function may be implemented for use by logic 103 in allocating resource usage among a plurality of causal paths in which a node is simultaneously active.

It is possible that measurements of resource consumption will show changes delayed somewhat from the actual execution of a causal path instance at a node. For example, there is a time delay between when processing commences and a change in power consumption is noted—the time delay depends in part on where in a system power consumption is being measured. This skew may be corrected for in the matching of the resource trace records and sub-intervals. One approach is to simply shift the trace timestamps by a value chosen (by modelling or experiment) to give the best results. Another approach is to allocate the resource consumption value in a given trace record to more than one interval in the timestamp sequence (perhaps including the reported interval, or perhaps just including prior intervals). U.S. patent application Ser. No. 10/601,371, filed Jun. 23, 2003, titled "ANALYSIS OF CAUSAL RELATIONS BETWEEN INTERCOMMUNICATING NODES" provides further detail concerning techniques for dealing with clock skew in traces made at different points within one distributed system, which may be utilized.

In operational block 47, all of the sub-interval allocations are aggregated for a given interval (of block 42), and then the resulting ascribed resource usage for the given node may be output by logic 103 (e.g., as output 104 in FIG. 1) in operational block 48. In block 44 the intervals (from the causal path analysis) are broken into sub-intervals. In block 46, each of those sub-intervals was given an allocation of the resource consumption. However, these sub-intervals are not themselves intrinsically meaningful with respect to the causal path pattern, because the boundary between two sub-intervals is effectively an accident, created by the arrival of some other causal path at an arbitrary time. Therefore, to provide a useful annotation, the resource allocations of all sub-intervals within a given interval are summed in block 47. Thus, for each interval on a causal path, all of the resource allocations for any of the sub-intervals belonging to that interval are collected. In certain embodiments, logic 103 may summarize the result for a given node for all executions of the same causal path, for example as a histogram of the resource use for each interval in a given causal path pattern. Depending on what is deemed mose useful to the user, the results may be further aggregated so that for all causal paths that have the same causal path pattern, for each interval in said pattern, the resource allocations for the corresponding interval in each of these causal paths can be summed, averaged, used to create a histogram, etc. This output may be output to a user (e.g., in some viewable representation), such as to a display, printer, or other output device, and/or the output may be to a data storage device and/or to some other logic (e.g., software) for further processing. For instance, the resulting output may be used by other software to, for example, control the behavior of the distributed system under analysis, or to visualize the results using a graphical user interface.

While the examples described above involve ascribing resource consumption to activity of a single node (Node B) in its causal paths during a time period of interest, resource consumption of other nodes may likewise be determined. Thus, for instance, energy consumption may be measured for Node A and ascribed to its activity in causal paths 1 (FIG. 5A) and 2 (FIG. 5B) in a manner like that described above for Node B. Thus, the respective quantified resource consumption by each of a plurality of different nodes in a distributed computing environment may be ascribed to the activities of such nodes in their causal paths.

In certain embodiments, logic 103 may look for changes in resource consumption rather than absolute values, as in the example algorithm described above. That is, instead of allocating the absolute value of a resource measurement to a sub-interval, it might be preferable to instead compute the change in the resource value in some way, and then allocate that change ("delta") instead of the absolute value. The change could be computed simply by calculating the difference between two successive absolute-value measurements, or by the difference between the current value and an exponentially-smoothed set of prior values, or by the difference between the current value and a running average of some number of prior values, or by the difference between the current value and the long-term average of all prior values, etc.

Figure 6:
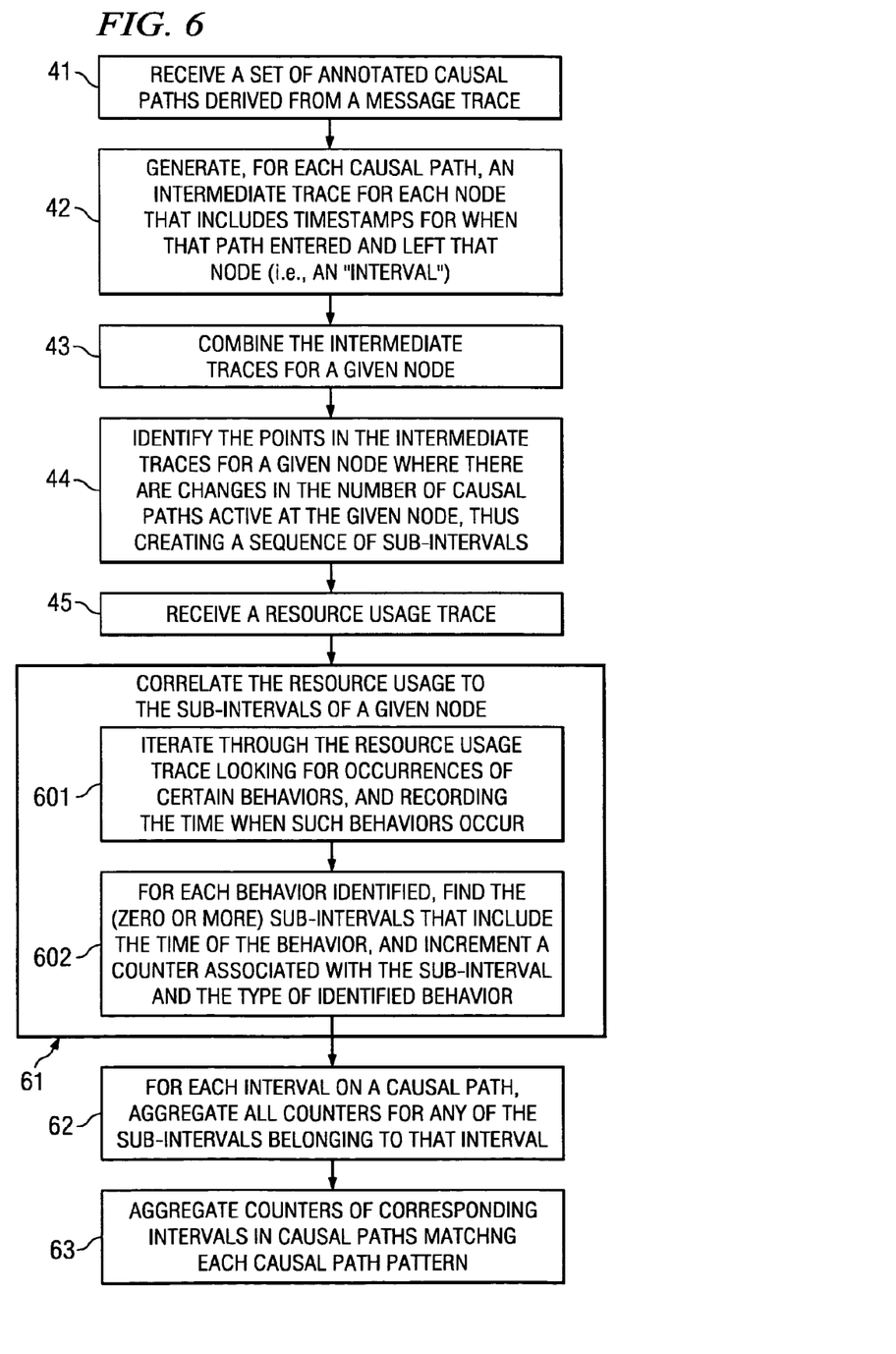
FIG. 6 shows another example algorithm that is employed in accordance with one embodiment.
Figure 7:
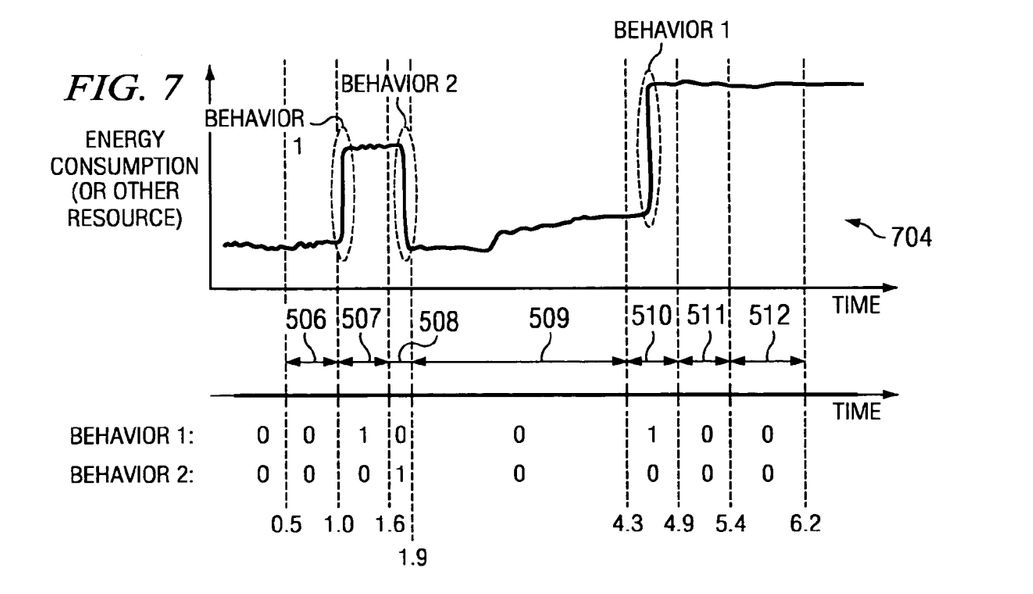
FIG. 7 shows an alternate resource consumption trace that is used in place of the resource consumption trace of FIG. 5C and that includes certain behaviors.

Turning to FIG. 6, another example algorithm that is employed by logic 103 in accordance with one embodiment for ascribing resource usage of a node to the node's causal paths is shown. Operational blocks 41-45 of FIG. 4 are again included in this example algorithm of FIG. 6, and description of those operations is not repeated here. As with the above discussion of FIG. 4, FIGS. 5A-5C will again be referred to in discussing the example operational flow of FIG. 6. Additionally, FIG. 7 is referred to in discussing the example operational flow of FIG. 6. FIG. 7 shows an alternate resource consumption trace 704 that is used in place of the resource consumption trace 504 of FIG. 5C, wherein resource consumption trace 704 includes certain behaviors as described further below.

In operational block 61 of FIG. 6, logic 103 correlates the resource usage to the sub-intervals of a given node (such as the sub-intervals identified in block 44, e.g., sub-intervals 506-512 of FIG. 5C). In this example, the correlation of resource usage includes detecting certain behaviors and allocating those detected behaviors to the sub-intervals of a given node. Thus, sub-operations 601 and 602 are included in the correlation operation of block 61 in this example. Sub-operation 601 iterates through the resource consumption trace looking for occurrences of certain behaviors and recording the time when such behaviors occur. Sub-operation 602 finds, for each behavior identified, the (zero or more) sub-intervals that include the time of the behavior, and increment a counter associated with the sub-interval and the type of identified behavior.

For example, referring to FIG. 7, example resource consumption trace 704 is shown, which includes occurrences of defined behaviors "behavior 1" and "behavior 2" therein. As described above, in sub-operation 601, the resource consumption trace is analyzed to identify the occurrences of these behaviors, and the corresponding time at which the identified behaviors occur is recorded. FIG. 7 also shows the sub-intervals 506-512, which correspond to those sub-intervals in timeline 503 of FIG. 5C described above. That is, sub-interval 506 is a period of activity of Node B in causal path 1 (FIG. 5A). Sub-interval 507 is a period of activity of Node B in both causal paths 1 (FIG. 5A) and 2 (FIG. 5B). Sub-interval 508 is a period of activity of Node B in causal path 2 (FIG. 5B). Sub-interval 509 is a period of no activity of Node B in the causal paths. Sub-interval 510 is a period of activity of Node B in causal path 1 (FIG. 5A). Sub-interval 511 is a period of no activity of Node B in the causal paths, and sub-interval 512 is a period of activity of Node B in causal path 2 (FIG. 5B).

In sub-operation 602, logic 103 determines those sub-intervals 506-512 that include one or more of the identified behavior occurrences and increments a counter for each occurrence in a given sub-interval. Thus, as shown in FIG. 7, a first occurrence of "behavior 1" is detected in sub-interval 507, and thus a counter is incremented to 1 for "behavior 1" in this sub-interval. If "behavior 1" would have occurred twice in sub-interval 507, the corresponding counter for this behavior in sub-interval 507 would have been incremented to 2. An occurrence of "behavior 2" is detected in sub-interval 508, and thus a counter is incremented to 1 for "behavior 2" in this sub-interval. An occurrence of "behavior 1" is detected in sub-interval 510, and thus a counter is incremented to 1 for "behavior 1" in this sub-interval. The count values determined for each behavior in each sub-interval may be recorded by logic 103 to an appropriate data storage (e.g., ROM, RAM, hard drive, CD, floppy disk, etc.).

In operational block 62 of FIG. 6, all of the sub-interval counters for each behavior are aggregated for a given interval (of block 42). Thus, for a given interval, as determined in block 42, a total count of the number of occurrences of "behavior 1" in such given interval is determined, and a total count of the number of occurrences of "behavior 2" in such given interval is determined. Thus, the count of 1 occurrence is recorded in sub-interval 507. Sub-interval 507 is included within each of two "intervals" of Node B—the interval between time T=0.5 and T=10.6 (when Node B is active for causal path 1 of FIG. 5A) and the interval between time T=10.0 and T=1.9 (when Node B is active for causal path 2 of FIG. 5B). Accordingly, in operation 62, each of these two intervals for Node B is provided with a count of 1 for the number of occurrences of "behavior 1" within such intervals. Therefore, it is known that "behavior 1" occurred once during this first interval of activity of Node B in causal path 1 and once during this first interval of activity of Node B in causal path 2. In other embodiments, the counter value may be divided equally among the intervals of node B that contain the given subinterval. For example, each of the two intervals for node B could be provided with a count of 1/2.

In operational block 63, a further processing step aggregate the counters of corresponding intervals in all causal paths matching each given causal path pattern. The aggregation may be output by logic 103 (e.g., as output 104 in FIG. 1) as a histogram, or average, or median, or another statistical figure, or a combination of the above. This output may be output to a user (e.g., in some viewable representation), such as to a display, printer, or other output device, and/or the output may be to a data storage device and/or to some other logic (e.g., software) for further processing. For instance, the resulting output may be used by other software to, for example, control the behavior of the distributed system under analysis, or to visualize the results using a graphical user interface. In certain embodiments, logic 103 may summarize the result for a given node for all executions of the same causal path, for example as a histogram of the occurrences of certain resource consumption behaviors detected for each interval in a causal path pattern.

In certain embodiments, the activity of FIGS. 4 and 6 may be combined such that the ascribed resource usage may be determined as in FIG. 4 and the occurrences of certain resource consumption behaviors may also be determined as in FIG. 6. In certain embodiments, the resource consumption behaviors may act as a trigger to initiate certain other events, such as ascribing the resource usage in the manner described in FIG. 4. For instance, upon a given resource consumption behavior being detected for an interval in a causal path, this may trigger ascribing the resource consumption over such interval of the causal path in the manner described in FIG. 4. Unless accompanying language specifies otherwise herein, reference to ascribing or allocating resource consumption (or "usage") to a node's activity in its causal path(s) is intended to encompass any type of ascribing or allocating, such as ascribing the measured values of resource consumption to the corresponding node activity in its causal path (as in the example flow of FIG. 4) and/or ascribing certain detected behaviors of the resource consumption to the corresponding node activity in its causal path (as in the example flow of FIG. 6).

Figure 8:
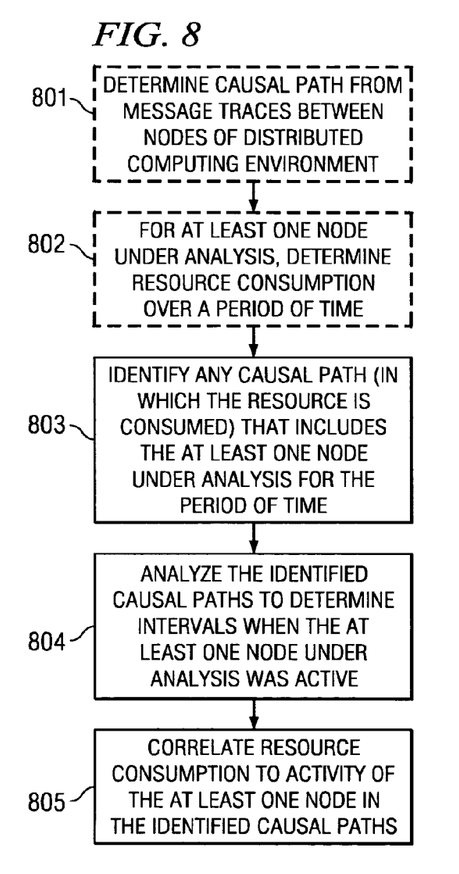
FIG. 8 shows a flow according to at least one embodiment.

In view of the above, various techniques may be used by logic 103 for ascribing resource consumption to node activity in a causal path. Turning to FIG. 8 a flow according to at least one embodiment of logic 103 is shown. In operational block 801, causal path(s) is determined from message traces between nodes of a distributed computing environment. As mentioned above, techniques as described more fully in U.S. patent application Ser. No. 10/601,371, filed Jun. 23, 2003, titled "ANALYSIS OF CAUSAL RELATIONS BETWEEN INTERCOMMUNICATING NODES", or other techniques now known or later discovered, may be employed by logic 103. This operation 801 is shown in dashed-lines as being optional because in certain implementations logic 103 is implemented to determine such causal path(s), while in other implementations logic 103 receives causal path(s) that are determined by any other suitable process.

In operational block 802, logic 103 determines, for at least one node under analysis, resource consumption over a period of time. Again, in certain embodiments logic 103 is implemented to determine such resource consumption, while in other implementations logic 103 receives the resource consumption trace that is determined by any other suitable mechanism. Resource consumption traces 504 (of FIG. 5C) and 704 (of FIG. 7) are examples of such resource consumption traces that may be determined/received in block 802.

In operational block 803, logic 103 identifies any causal path in which the resource is consumed that includes the at least one node under analysis for the period of time for which resource consumption is known. For instance, assuming that a plurality of causal paths include a node that is of interest (e.g., Node B) and further assuming that such plurality of causal paths have an impact on the consumption of a given resource (e.g., energy usage, etc.) by such node of interest, all of those plurality of causal paths are identified. Such plurality of causal paths may all have the same causal path pattern or may have different causal path patterns.

In operational block 804, logic 103 analyzes the identified causal paths (from block 803) to determine intervals in which the at least one node under analysis (e.g., Node B) was active. For instance, timelines 501 and 502 of FIG. 5C identify intervals in which Node B was active in causal paths 1 (FIG. 5A) and 2 (FIG. 5B), respectively.

In operational block 805, logic 103 correlates resource consumption of the at least one node under analysis (e.g., Node B) to activity of such at least one node in the identified causal paths. For instance, as shown in FIG. 5C, logic 103 correlates the resource consumption 504 of Node B to its activity in causal paths 1 and 2 (as reflected in timelines 501 and 502), resulting in correlation 505. As another example, FIG. 7 described above illustrates that such correlation may involve detecting certain resource consumption behavior and correlating the detected resource consumption behavior of a node to the node's activity in its causal paths.

Figure 9:
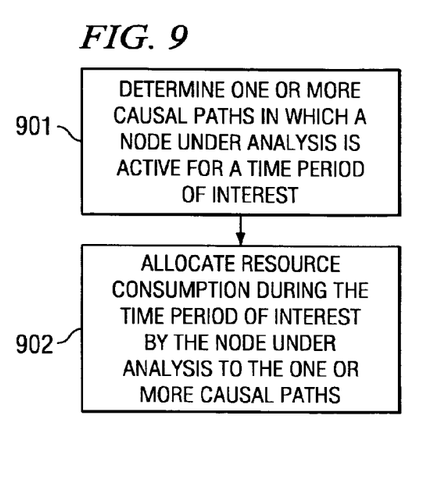
FIG. 9 shows yet another example flow according to at least one embodiment.

FIG. 9 shows yet another example flow according to at least one embodiment of logic 103. In operational block 901, logic 103 determines one or more causal paths in which a node under analysis is active for a time period of interest. For instance, in the example of FIGS. 5A-5C, causal paths 1 and 2 are identified as causal paths in which Node B is active. Such causal paths occur within the time period T=0 and T=7, and thus if this is the time period that is of interest and Node B is a node that is under analysis, such causal paths 1 and 2 will be determined in block 901 as causal paths to use in the analysis. Such determined causal paths may all have the same causal path pattern or may have different causal path patterns.

In operational block 902, logic 103 allocates resource consumption during the time period of interest by the node under analysis to the one or more causal paths. Thus, for instance, a portion of resource consumption 504 of Node B in FIG. 5C is allocated to Node B's activity in causal path 1 (FIG. 5A) and a portion of such resource consumption 504 is allocated to Node B's activity in causal path 2 (FIG. 5B), as reflected in allocation 505.

Figure 10:
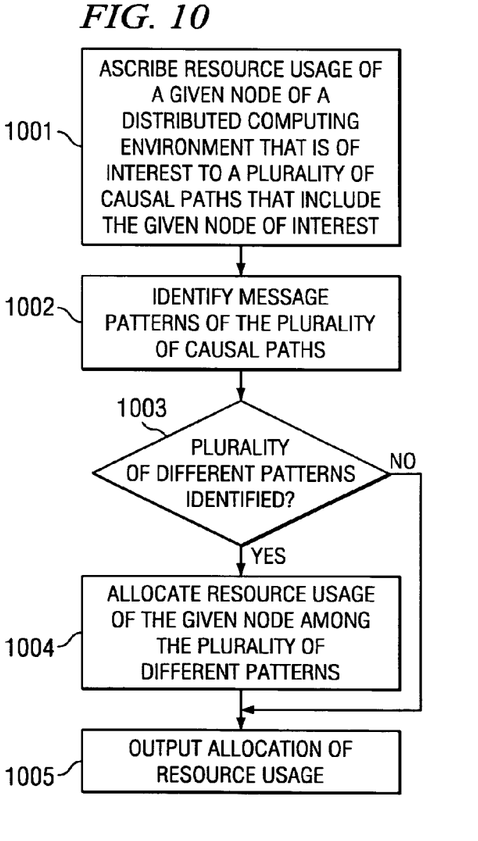
FIG. 10 shows an example operational flow according to at least one embodiment for allocating resource usage of a node of interest among a plurality of different causal path patterns that include such node.

As mentioned above, in certain embodiments, logic 103 may not only ascribe resource usage of a node to its respective causal paths, but may also allocate the resource usage among a plurality of different causal path patterns in which the node is included. Thus, the operational flow of logic 103 according to one embodiment is shown in FIG. 10. In operational block 1001 logic 103 ascribes resource usage of a given node that is of interest to a plurality of causal paths that include the given node of interest. Example techniques for ascribing such resource usage to the plurality of causal paths are described further above in conjunction with FIGS. 4-9. In operational block 1002, the message patterns (or "causal path patterns") included in the plurality of causal paths are identified. For instance, in the example of FIG. 3, causal paths 1-4 are received by logic 103. In operational block 1001, logic 103 may ascribe resource usage of Node B (as reflected in resource usage trace 302) to the causal paths 1-3, in which Node B is included. Thus, a portion of Node B's resource usage may be ascribed to its activity in causal path 1, a portion of Node B's resource usage may be ascribed to its activity in causal path 2, and a portion of Node B's resource usage may be ascribed to its activity in causal path 3. In the example of FIG. 3, causal paths 1 and 3 have the same causal path pattern, while causal path 2 has a different causal path pattern. Thus, in operational block 1002, logic 103 may identify these two different causal path patterns that are included in the plurality of causal paths that include Node B.

In operational block 1003, logic 103 determines whether a plurality of different patterns are identified. If so, resource usage of the given node of interest is allocated among the plurality of different patterns in operational block 1004. Thus, continuing with the example of FIG. 3, logic 103 may allocate the resource of Node B among the two different causal paths identified. This may be performed, for example, by aggregating the resource usage ascribed to causal paths of each pattern type. For instance, the resource usage ascribed to causal paths 1 and 3 may be aggregated to determine an allocation of resource usage to the first causal path pattern, while the resource usage ascribed to causal path 3 is allocated to the second causal path pattern. In operational block 1005, the allocation of resource usage (either to a single causal path pattern or among a plurality of different causal path patterns) is output. This output may be output to a user (e.g., in some viewable representation), such as to a display, printer, or other output device, and/or the output may be to a data storage device and/or to some other logic (e.g., software) for further processing. For instance, the resulting output may be used by other software to, for example, control the behavior of the distributed system under analysis, or to visualize the results using a graphical user interface.

The various embodiments of resource consumption ascribing logic 103 described above may be implemented via computer-executable software code. The executable software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, computer readable media can include any medium that can store or transfer information.

Ascribing usage of resources to specific nodes on a causal path in a distributed computing environment, such as in the embodiments described above, enable various applications. That is, by inferring the causes of resource consumption and ascribing this consumption to specific paths through a distributed computing system, such information may be beneficially used in various applications. Further, allocating the resource usage of a given node to each of a plurality of different causal path patterns in which such node is included may also be useful for various applications. It might be useful to have this information, for example, to allow a system developer to improve overall resource consumption or to improve the balance of resource consumption (which might in turn, for instance, improve cooling efficiency, etc.), or to anticipate future problems such as overutilization of a resource at a specific node. One might move a certain computation from one kind of computer to another in order to better balance energy consumption with processing-time requirements, or decide to keep data in a memory cache rather than on disk to avoid the energy costs of using a disk drive. Or, one might add or remove redundant components from a system in order to balance energy use with either of redundancy or throughput requirements. Suppose, for instance, that a large amount of resource consumption by a given node (e.g., Node B) in a multi-tier Web application is ascribed to that node's activity in a first causal path pattern, which is a causal path pattern corresponding to when the node is invoked by a "shopping-cart component," while smaller amounts of resource consumption by that node are ascribed to its activity in a second causal path pattern, which is a causal path pattern corresponding to when the node is invoked by a "user-profile component." Thus, this information may enable the system to be improved to better handle the situation in which a shopping-cart component of the Web application invokes the node.

What is claimed is:

1. A method, comprising by a computer system:
   identifying a plurality of causal paths that include a node of a distributed computing environment that is of interest;
   analyzing the identified plurality of causal paths to determine a time interval when the node was simultaneously active in the plurality of causal paths;
   determining an amount of consumption of a resource by the node to the node's activity in the plurality of causal paths for a duration of the time interval;
   using the duration of the time interval and the determined amount of consumption in a calculation to determine at least a portion of the amount of consumption of said resource attributed to each path of the plurality of causal paths in which said node was simultaneously active at the time interval; and
   in a non-transitory computer-readable medium storing the determined at least a portion of the amount of consumption of said resource attributed to each path of the plurality of causal paths in which said node was simultaneously active at the time interval.

2. The method of claim 1 wherein the identifying comprises:
   analyzing messages between said node that is of interest and at least one other node of said distributed computing environment; and
   based on the analyzing, identifying each causal path as a respective set of the messages exchanged between nodes of the distributed computing environment and associated with a respective communication activity.

3. The method of claim 1 wherein said analyzing comprises:
   analyzing the plurality of causal paths to determine at least one time interval in each of said plurality of causal paths when the node was active.

4. The method of claim 3 further comprising: determining any time intervals in which said node that is of interest is active in multiple ones of said plurality of causal paths.

5. The method of claim 1 wherein the node comprises a cluster of computers.

6. The method of claim 1 wherein said analyzing comprises:
   analyzing times at which messages are received by the node and sent from the node in the identified plurality of causal paths to determine at least one time interval when the node was active in the plurality of causal paths.

7. A system, comprising:
   logic circuitry operable to determine a plurality of causal paths of a distributed computing environment where a node was simultaneously active in the plurality of causal paths at a time interval, wherein each causal path is a respective set of messages exchanged between nodes of the distributed computing environment and associated with a respective communication activity;
   logic circuitry operable to receive at least one resource consumption trace quantifying resource consumption by the node; and
   logic circuitry operable to perform operations comprising determining an amount of the resource consumption from the trace for the node's activities in the plurality of causal paths for a duration of the time interval, and using the duration of the time interval and the determined amount of consumption in a calculation to determine at least a portion of the amount of consumption attributed to each path of the plurality of causal paths in which said node was simultaneously active at the time interval.

8. The system of claim 7 wherein the plurality of causal paths comprises a set of messages associated with an activity.

9. The system of claim 8 wherein receipt by a node of one of the messages in the set of messages leads to the transmission by the node of another of the messages in the set of messages.

10. A method, comprising by a computer system:
determining, for a time period of interest, whether a node was active in more than one causal path simultaneously at a point during the time period of interest, wherein each causal path is a respective set of messages exchanged between nodes of the distributed computing environment and associated with a respective communication activity; and
if determined that the node was active in more than one causal path simultaneously, then
determining an amount of consumption of a resource by the node to the node's activity in the causal paths at the point during the time period of interest,
using a duration of the time period of interest and the determined amount of consumption in a calculation to determine at least a portion of the amount of consumption attributed to each path of the causal paths in which said node was simultaneously active at said point; and
in a non-transitory computer-readable medium storing the determined at least a portion of the amount of consumption attributed to each path of the causal paths in which said node was simultaneously active at said point.

11. The method of claim 10 wherein said determining comprises:
receiving a set of annotated causal paths derived from a message-trace;
generating, for each causal path, an intermediate trace for the node under analysis, said intermediate trace including timestamps identifying when the causal path entered and left said node; and
identifying points in the intermediate traces for the node where there are changes in the number of causal paths in which the node was active, thus creating a sequence of sub-intervals.

12. The method of claim 11 further comprising:
receiving a resource consumption trace defining said resource consumption by the node during the time period of interest.

13. The method of claim 12 wherein said allocating comprises:
correlating the resource consumption trace to the sub-intervals.

14. The method of claim 10 wherein said node is a node in a distributed computing environment, and further comprising: determining a plurality of causal paths that include the more than one causal path for the node under analysis, wherein said plurality of causal paths comprise a plurality of different patterns of messages between nodes of said distributed computing environment; and said allocating comprises allocating said resource consumption by the node under analysis among the plurality of patterns.

15. A method, comprising by a computer system:
determining at least a first causal path defined by a first pattern of messages between nodes of a distributed computing environment, said at least a first causal path including a node of said distributed computing environment that is of interest;
determining at least a second causal path defined by a second pattern of messages between said nodes of said distributed computing environment, said at least a second causal path including the node of interest, and the node of interest was simultaneously active in the at least a first causal path and the at least a second causal path at a time interval;
determining an amount of consumption of a resource by the node of interest to the first and second causal paths for a duration of the time interval;
using the duration of the time interval, the determined amount of consumption, and the first and second message patterns in a calculation to determine at least a portion of the amount of consumption attributed to each of the first and second causal paths at the time interval; and
in a non-transitory computer-readable medium storing the determined at least a portion of the amount of consumption attributed to each of the first and second causal paths at the time interval.

16. An article of manufacture comprising:
a non-transitory computer-readable storage medium encoded with computer-executable software code comprising:
code for ascribing resource usage of a given node of a distributed computing environment that is of interest to a plurality of causal paths that include the given node of interest, and the given node was simultaneously active in the plurality of causal paths at a time interval;
code for identifying message patterns in the plurality of causal paths;
code for determining an amount of consumption of a resource by the given node to the plurality of causal paths for a duration of the time interval, and using the duration of the time interval, the determined amount of consumption, and the message patterns in a calculation to determine at least a portion of the amount of consumption attributed to each of the plurality of causal paths at the time interval; and
code for outputting the determined portion of the amount of consumption attributed to each of the plurality of causal paths.

17. The computer-executable software code of claim 16 further comprising: code for receiving a resource usage trace indicating the amount of consumption.

18. A method, comprising by a computer system:
identifying a period when a plurality of causal paths are simultaneously active at a given node of a distributed computing environment, wherein each causal path is a respective set of messages exchanged between nodes of the distributed computing environment and associated with a respective communication activity;
identifying an amount of a resource consumed during the identified period by the given node;
using a duration of the identified period and the identified amount of consumption in a calculation to determine at least a portion of the amount of consumption attributed to each of the plurality of causal paths at the identified period; and
in a non-transitory computer-readable medium storing the determined at least a portion of the amount of consumption attributed to each of the plurality of causal paths at the identified period.

19. The method of claim 18 wherein said allocating comprises: allocating the identified amount of resource consumption among the plurality of simultaneously active causal paths based on message patterns in the plurality of simultaneously active causal paths.

20. The method of claim 1 wherein the analyzing comprises analyzing to determine the at least one time interval corresponding to a period of time the node is processing an activity of the plurality of causal paths.

21. The method of claim 1 wherein the analyzing comprises analyzing to determine the at least one time interval corresponding to a period of time an activity of a message of the plurality of causal paths is resident at the node.

22. The method of claim 13 wherein the correlating comprises correlating the consumption of the resource by the node to the node's activity in the plurality of causal paths comprising processing an activity of a message of the plurality of causal paths by the node.

23. The method of claim 15 wherein the determinings individually comprise determining a respective one of the first and second causal paths defined by respective ones of the first and second patterns of messages after communications of the messages of the first and second patterns between the nodes of the distributed computing environment, and wherein the allocating comprises allocating after the determinings.

24. The method of claim 1 wherein the duration is based on an aggregation of time intervals when the node was simultaneously active for each path of the plurality of causal paths.

25. The method of claim 7 wherein the duration is based on an aggregation of time intervals when the node was simultaneously active for each path of the plurality of causal paths.

26. The method of claim 10 wherein the duration is based on an aggregation of time periods when the node was simultaneously active for each path of the causal paths.

27. The method of claim 15 wherein the duration is based on an aggregation of time intervals when the node of interest was simultaneously active for the first and second causal paths.

28. The method of claim 16 wherein the duration is based on an aggregation of time intervals when the given node was simultaneously active for each of the plurality of causal paths.

29. The method of claim 18 wherein the duration is based on an aggregation of identified periods when the given node was simultaneously active for each of the plurality of causal paths.

* * * * *